United States Patent
Hughes

(10) Patent No.: US 12,170,013 B2
(45) Date of Patent: Dec. 17, 2024

(54) ELECTRONIC TAG

(71) Applicant: G4S Monitoring Technologies Limited

(72) Inventor: Aled Hughes, Worksop (GB)

(73) Assignee: Allied Universal Electronic Monitoring Limited, Worksop (GB)

( * ) Notice: Subject to any disclaimer, the term of this patent is extended or adjusted under 35 U.S.C. 154(b) by 128 days.

(21) Appl. No.: 17/764,243

(22) PCT Filed: Sep. 23, 2020

(86) PCT No.: PCT/GB2020/052306
§ 371 (c)(1),
(2) Date: Mar. 28, 2022

(87) PCT Pub. No.: WO2021/064354
PCT Pub. Date: Apr. 8, 2021

(65) Prior Publication Data
US 2022/0351602 A1    Nov. 3, 2022

(30) Foreign Application Priority Data

Sep. 30, 2019 (GB) ..................................... 1914109

(51) Int. Cl.
*G08B 21/22* (2006.01)
*G08B 21/18* (2006.01)
(Continued)

(52) U.S. Cl.
CPC ........... *G08B 21/22* (2013.01); *G08B 21/182* (2013.01); *H04W 4/021* (2013.01); *H04W 4/023* (2013.01); *H04W 4/029* (2018.02)

(58) Field of Classification Search
CPC ..... H04W 4/029; H04W 4/021; H04W 4/023; G08B 21/22; G08B 21/182
(Continued)

(56) References Cited

U.S. PATENT DOCUMENTS 8,723,669 B2 * 5/2014 Freathy .................. G08B 21/22
455/456.1
2009/0219013 A1 * 9/2009 Hechinger ........... H03K 17/972
324/207.15

(Continued)

FOREIGN PATENT DOCUMENTS

| EP | 2290391 A1 | 3/2011 |
| GB | 2473067 A | 2/2011 |

(Continued)

OTHER PUBLICATIONS

PCT International Search Report for PCT International Patent Application No. PCT/GB2020/052306.
(Continued)

*Primary Examiner* — Kam Wan Ma
(74) *Attorney, Agent, or Firm* — Olive Law Group, PLLC

(57) ABSTRACT

An electronic tag can be secured to a body of a person. The electronic tag has an antenna which transmits or receives an electromagnetic signal. An inductive proximity sensor determines a proximity of a metallic object to the electronic tag, based on electromagnetic coupling between the inductive proximity sensor and the metallic object. The inductive proximity sensor determines, based on the proximity being below a proximity threshold, that a metallic object is attenuating the electromagnetic signal transmitted or received by the antenna.

11 Claims, 3 Drawing Sheets

(51) Int. Cl.
    *H04W 4/02*      (2018.01)
    *H04W 4/021*     (2018.01)
    *H04W 4/029*     (2018.01)

(58) Field of Classification Search
    USPC ...................................... 340/573.4
    See application file for complete search history.

(56)               References Cited

U.S. PATENT DOCUMENTS

2010/0090825 A1     4/2010  Freathy
2011/0050446 A1*    3/2011  Anderson ............... G01S 13/04
                                                         340/686.6
2012/0313757 A1*   12/2012  Volpi ................. G06K 7/10366
                                                          340/10.1
2014/0179342 A1     6/2014  Hamerly

FOREIGN PATENT DOCUMENTS

GB          2477917 A        8/2011
WO       2014/105500 A2      7/2014

OTHER PUBLICATIONS

Search and Examination Report for GB Patent Application No. GB1914109.2 dated Jan. 20, 2020.

\* cited by examiner

ELECTRONIC TAG

CROSS REFERENCE TO RELATED APPLICATIONS

This application claims priority to PCT International Patent Application No. PCT/GB2020/052306, filed Sep. 23, 2020, and titled ELECTRONIC TAG, which claims priority to United Kingdom Patent Application No. GB 1914109.2, filed Sep. 30, 2019; the contents of which are incorporated by reference in their entireties.

FIELD OF THE INVENTION

The present invention relates to an electronic tag, such as an electronic tag for monitoring the location of a person.

BACKGROUND OF THE INVENTION

An offender may be fitted with an electronic tag in order to enforce conditions prescribed to the offender as a punishment for an offence, as a condition of their release on bail or as a condition of their early release from prison. Examples of conditions that can be enforced by an electronic tag are curfews (which prevent the offender leaving their home at certain times, especially at night) and exclusion zones (which prevent the offender from visiting certain places, such as a victim's home). Electronic tags can also be used to monitor the location of vulnerable patients, such as the elderly or people with mental health disorders.

Electronic tags typically send and receive radiofrequency communications with other devices. For example, the electronic tag may determine its location by exchanging radiofrequency signals between the electronic tag and a fixed monitoring unit, or by receiving GPS signals from GPS satellites. Also, the electronic tag may send radiofrequency communications, for example, to raise an alarm when a prescribed condition is breached.

Sometimes, the person wearing the electronic tag would like to disguise their location, for example, to allow them to break their curfew or visit a location in one of their exclusion zones. Removing the electronic tag is usually not an option as electronic tags tend to be securely attached to the person and have tamper detection, making it impossible to remove the electronic tag without detection. So, the person wearing the tag may instead try to prevent the electronic tag from making and receiving radiofrequency communications in an attempt to disguise their real location or in an attempt to prevent the electronic tag from reporting or raising an alarm.

One way to attempt this is to deliberately block the radiofrequency communications, for example, by wrapping a sheet of metal foil around the electronic tag. EP 2,290,391 A1 attempts to determine if the radiofrequency communications are being deliberately blocked by measuring reflections caused by the metal foil. However, this technique cannot distinguish metal foil from other objects surrounding the electronic tag, including the body of the person wearing the electronic tag. This tends to lead to false positives which need to be investigated, wasting resources.

It would, therefore, be desirable to find a way to more accurately identify deliberate blocking caused by metal foil being wrapped around an electronic tag.

SUMMARY OF THE INVENTION

According to a first aspect of the invention, there is provided an electronic tag configured to be secured to a body of a person. The electronic tag comprises an antenna configured to transmit or receive an electromagnetic signal and an inductive proximity sensor. The inductive proximity sensor is configured to determine a proximity of a metallic object to the electronic tag, based on electromagnetic coupling between the inductive proximity sensor and the metallic object. The inductive proximity sensor is also configured to determine, based on the proximity being below a proximity threshold, that a metallic object is attenuating the electromagnetic signal transmitted or received by the antenna.

By using an inductive proximity sensor, it is possible to distinguish metallic obstructions (such as metal foil wrapped around the electronic tag) which are likely to represent deliberate attempts to block the electromagnetic signal transmitted or received by the antenna, from everyday non-metallic objects in the vicinity of the electronic tag (such as the body of the person wearing the electronic tag). The inductive proximity sensor includes an inductor (such as a coil) configured to generate a first alternating magnetic field which has no effect on a non-metallic object but which is coupled into nearby metallic objects (such as metal foil wrapped around the electronic tag) inducing eddy currents. These eddy currents generate a second alternating magnetic field in the metallic object which is coupled back into the inductor, leading to a measurable change in the inductance of the inductor which can be related to the proximity of the metallic object. Since the inductive proximity sensor can more accurately identify deliberate blocking (such as that caused by metal foil wrapped around the electronic tag), the inductive proximity sensor is much less prone to false positives.

It may be determined that a metallic object is attenuating the electromagnetic signal transmitted or received by the antenna in response to both the proximity being below the proximity threshold and based on a signal strength of the electromagnetic signal. For example, the signal strength may indicate that the electronic tag is unable to receive an electromagnetic signal. Alternatively, the signal strength may have reduced while the proximity has been below the proximity threshold and optionally the signal strength may vary with the value of the proximity.

By using both the proximity being below the proximity threshold and the signal strength of the electronic signal, the electronic tag may more reliably distinguish metallic objects that happen to be in the vicinity of the person (such as furniture, radiators, etc) from deliberate attempts to block transmission or reception of electromagnetic signals caused by, for example, wrapping metal foil around the electronic tag. This is because metallic objects in the vicinity of the person may be detected as having a proximity below the proximity threshold but will tend not to block or significantly attenuate the reception of electromagnetic signals. In contrast, deliberate attempts to block transmission or reception of electromagnetic signals, for example, by wrapping metal foil around the electronic tag, will cause detection of a proximity below the proximity threshold and block (or at least attenuate) the reception of electromagnetic signals. The electronic tag being unable to receive an electromagnetic signal may mean that the antenna received an electromagnetic signal (such as a location signal from a GPS satellite) below a detection threshold or noise floor.

The inductive proximity sensor may be activated in response to the electronic tag being unable to receive an electromagnetic signal for a period of time. The inductive proximity sensor may be activated in response to the electronic tag being unable to receive a reply to a transmitted electromagnetic signal within a period of time.

The inductive proximity sensor may check for obstructions only if the electronic tag is unable to communicate with the outside world, that is, if the electronic tag does not receive an electromagnetic signal for a period of time, or does not receive a reply to a transmitted electromagnetic signal within a period of time, as the lack of communications may indicate that an attempt is being made to deliberately block electromagnetic signals to/from the electronic tag. For example, the proximity sensor may be activated if no external location signal has been received for a particular period of time which might indicate that the electronic tag has been wrapped in metal foil. By providing an initial check for whether the electronic tag might be obstructed by an object before activating the inductive proximity sensor to confirm whether that object is metallic, power consumption may be reduced and battery life may be improved.

The electronic tag may be configured to determine the location of the electronic tag based on an external location signal. The inductive proximity sensor may be activated in response to the electronic tag being unable to receive the external location signal for a period of time. The external location signal may be a GPS signal (for example, from a GPS satellite). The electronic tag may determine the location of the electronic tag based on the GPS signal.

The inductive proximity sensor may periodically determine the proximity of the metallic object to the electronic tag. It may be desirable to check periodically for metallic objects in proximity of the electronic tag, regardless of whether or not the electronic tag is able to transmit/receive electromagnetic signals (for example, even if the electronic tag is able to receive an external location signal) because an attempt may have been made to block the electromagnetic signals with a metallic object which does not completely block receipt of electromagnetic signals.

The electronic tag may further comprise a computer-readable storage medium (such as a memory) configured to store a blocked state. The blocked state may indicate that the electronic tag is blocked based on a plurality of proximity determinations being below the proximity threshold. The blocked state may indicate that the electronic tag is unblocked based on a plurality of proximity determinations being above the proximity threshold.

The blocked state may be based on a value of a counter. The value of the counter may be configured to be changed (for example, incremented) towards a blocked threshold in response to a proximity determination of the plurality of proximity determinations being below the proximity threshold. The value of the counter may be configured to be changed (for example, decremented) towards an unblocked threshold in response to a proximity determination of the plurality of proximity determinations being above the proximity threshold.

The blocked state may be set to blocked in response to the value of the counter reaching the blocked threshold. The blocked state may be set to unblocked in response to the value of the counter reaching the unblocked threshold.

By determining the blocked state in this way, using a plurality of proximity determinations recorded, for example, with a counter, the electronic tag is better able to distinguish between deliberate attempts to block the electromagnetic tag from metallic objects which are detected that happen to be in the vicinity of the electronic tag.

The electronic tag may be configured to generate a message indicating a change in the blocked state. The message may be transmitted to a monitoring station in response to the electronic tag being able to transmit and/or receive an electromagnetic signal. It may be determined that the electronic tag is able to transmit and/or receive an electromagnetic signal based on determining that the proximity is above the proximity threshold. While the metallic object, such as the metal foil, is obstructing the antenna, the electronic tag may be prevented from transmitting an alarm signal to the monitoring centre. At these times, a record of the times when the proximity was below the proximity threshold is recorded on the computer-readable storage medium. As soon as the metallic object obstructing the antenna is removed, for example, as soon as the person wearing the electronic tag removes the metal foil they had wrapped around it, the proximity changes to being above the proximity threshold which indicates to the electronic tag to send the record to the monitoring centre for investigation.

It may be determined that a metallic object is attenuating the electromagnetic signal in response to the proximity being below a proximity threshold for one or more of: a period of time; a plurality of proximity measurements; and a plurality of failed attempts to obtain an external location signal.

The metallic object may be metal foil, for example, aluminium foil.

BRIEF DESCRIPTION OF THE DRAWINGS

The invention shall now be described, by way of example only, with reference to the accompanying drawings in which.

DETAILED DESCRIPTION

Figure 1:
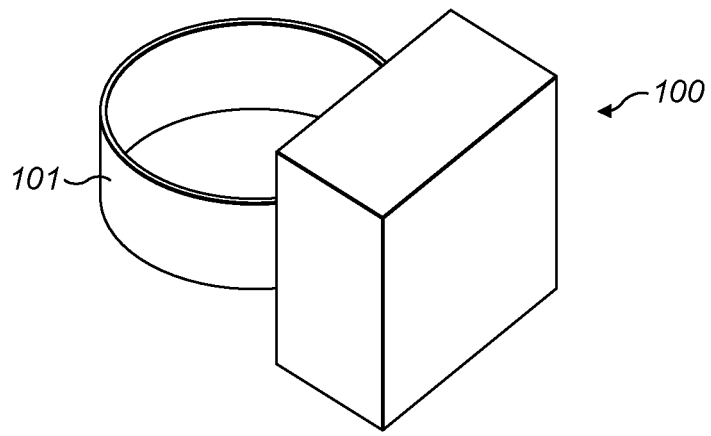
FIG. 1 shows an electronic tag with a tether for attaching the electronic tag to a person.
Figure 2:
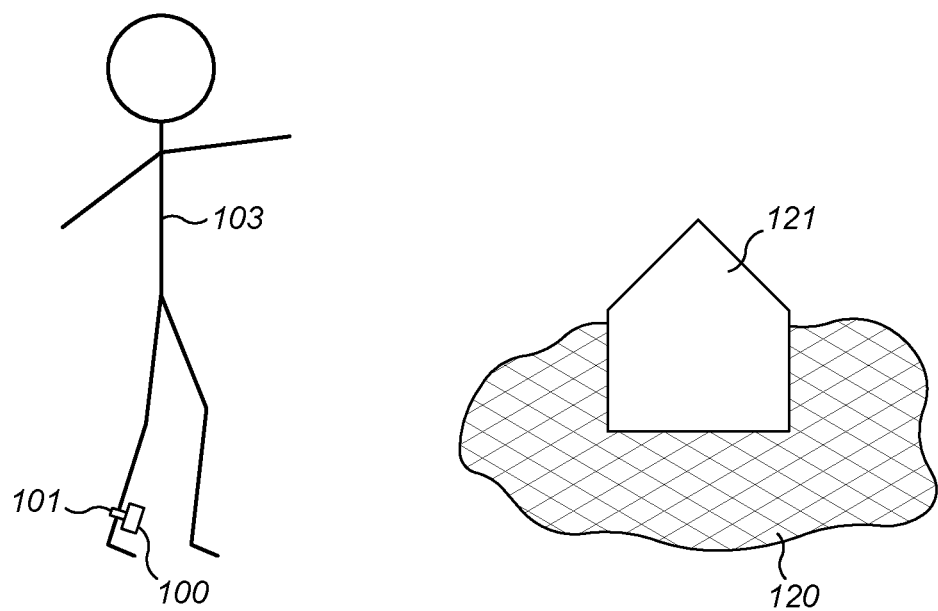
FIG. 2 shows the electronic tag secured around the ankle of a person using the tether.

FIG. 1 illustrates an electronic tag 100 with a tether 101 for securing the electronic tag 100 to an offender 103, typically securing the electronic tag 100 around their ankle (as shown in FIG. 2). The electronic tag 100 monitors the position of the offender 103, so it can be determined whether the offender 103 is adhering to one or more prescribed conditions, such as remaining outside an exclusion zone 120 around a victim's house 121 prescribed as a condition of the early release of offender 103 from prison.

Figure 3:
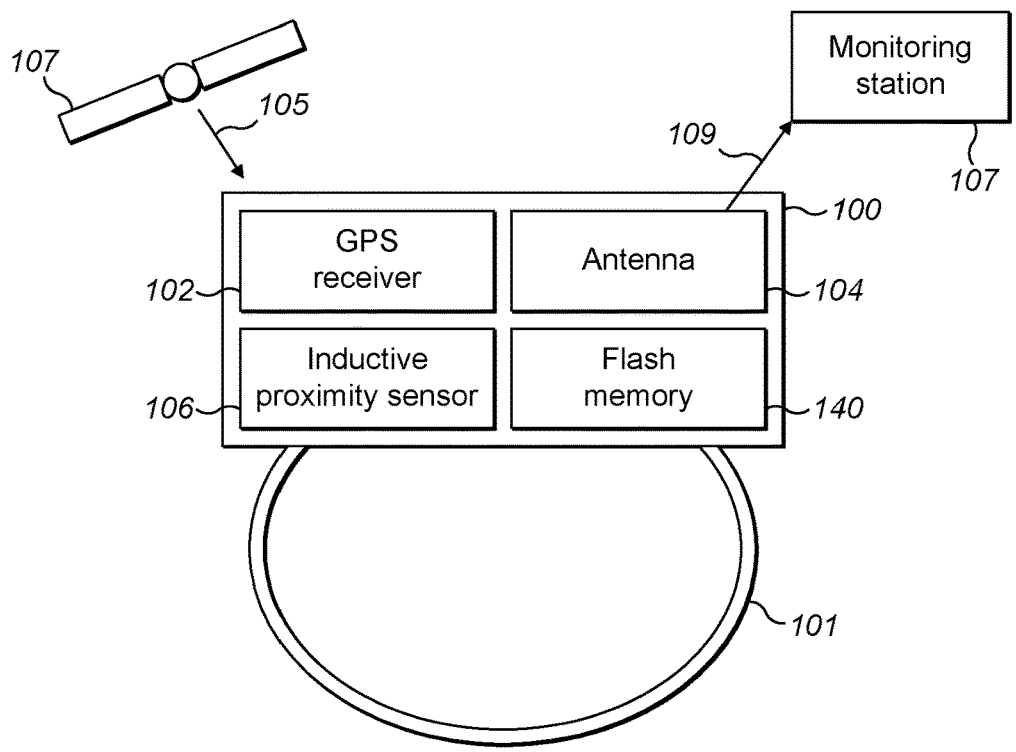
FIG. 3 shows an electronic tag which determines the position of the person based on GPS signals received by the electronic tag.

FIG. 3 shows how the electronic tag 100 determines the position of the offender 103. The electronic tag 100 has a GPS receiver 102 which periodically receives GPS signals 105 from GPS satellites 107. The GPS receiver 102 uses the received GPS signals 105 to determine the location of the electronic tag 100, and hence the location of the offender 103. The electronic tag 100 sends location information 109 indicating the location of the offender 103 to a monitoring station 107 via antenna 104 as a radiofrequency signal, so that the monitoring station 107 can monitor where the offender 103 is in relation to their exclusion zone 120.

Figure 4:
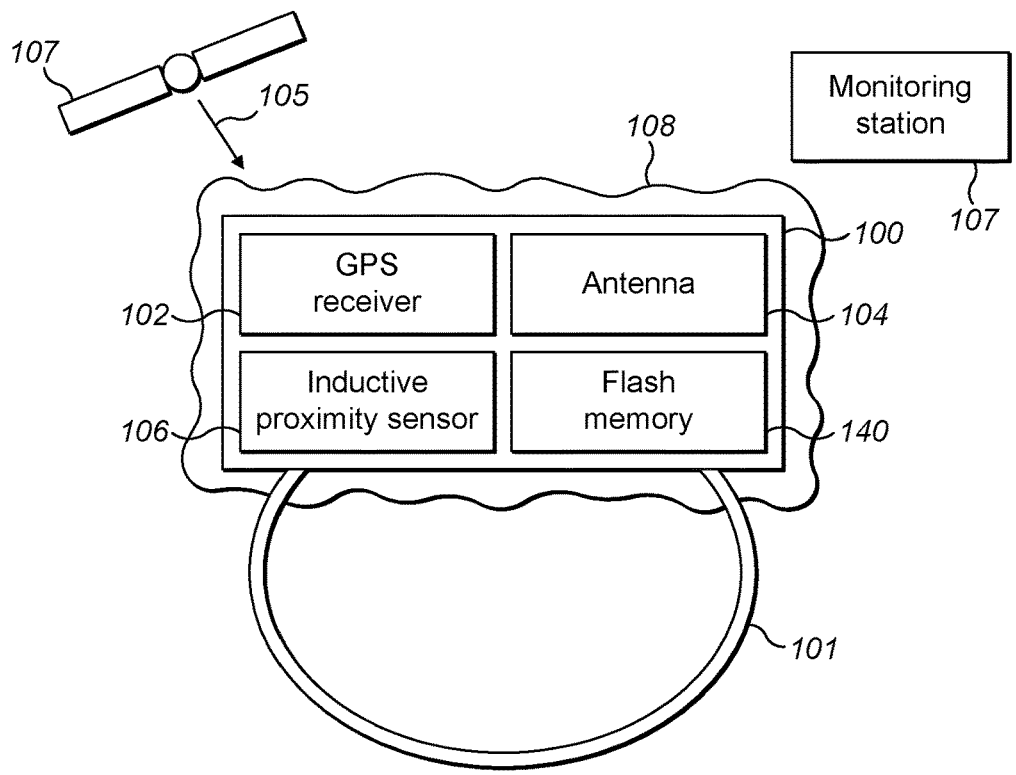
FIG. 4 shows an electronic tag where receipt of the GPS signals is blocked by metal foil wrapped around the electronic tag.

The offender 103 may attempt to disguise their location (for example, to allow the offender 103 to visit a location inside the exclusion zone 120). As shown in FIG. 4, the offender 103 may do this by wrapping the electronic tag 100 in metal foil 108 (such as aluminium foil) to prevent the electronic tag 100 from receiving the GPS signals 105 and to prevent the electronic tag 100 from sending location information 109 to the monitoring station 107.

Figure 5:
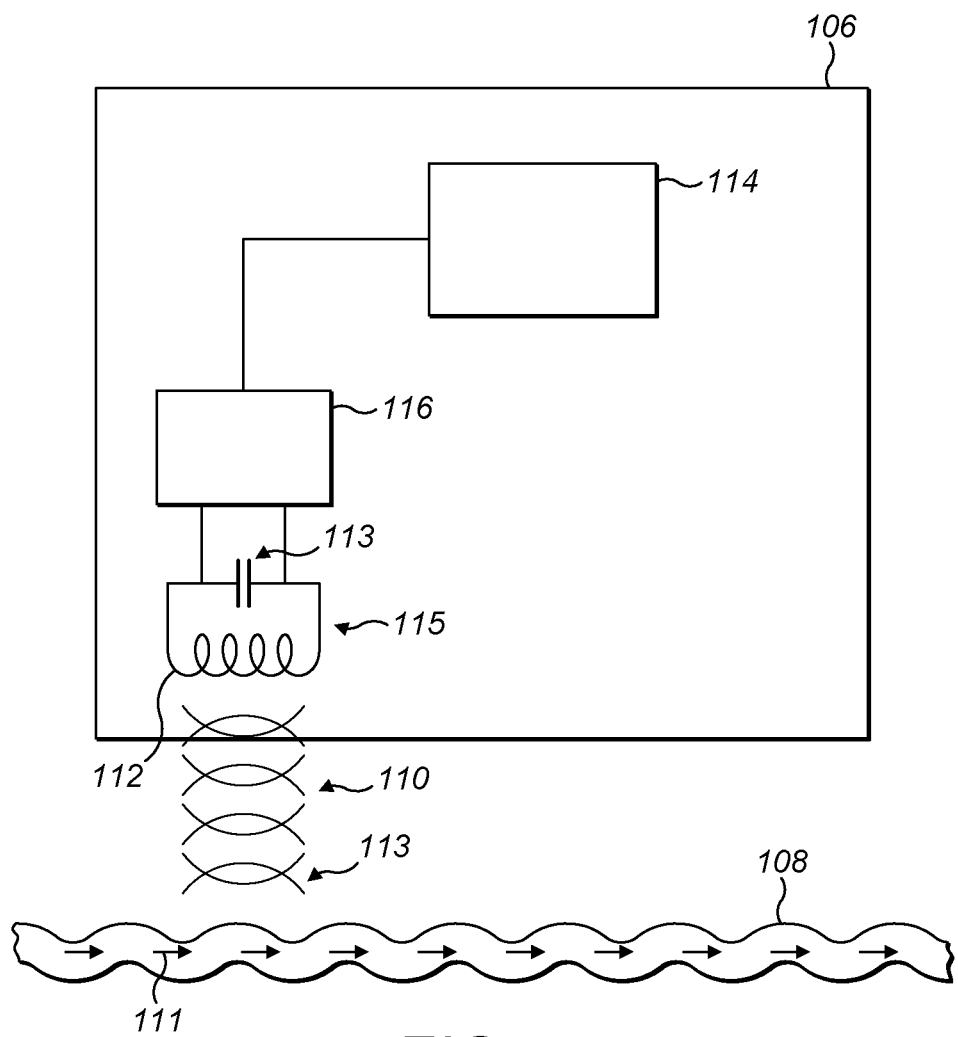
FIG. 5 shows an inductive proximity sensor for detecting whether metal foil has been wrapped around the electronic tag.

FIG. 5 illustrates an inductive proximity sensor 106 for detecting whether there is metal in proximity to the electronic tag 100 which might indicate that metal foil 108 has been wrapped around the electronic tag 100 in an attempt to block the receipt of GPS signals 105 and the transmission of location information 109.

The inductive proximity sensor 106 has a coil 112 connected to a capacitor 113 to form a resonant circuit 115. A resonant drive circuit 116 provides an alternating current drive signal to match the frequency of the resonant circuit 115 which generates a first alternating magnetic field 110 which is coupled into any metallic object (such as metal foil 108) in the vicinity, inducing eddy currents 111 in the metallic object. These eddy currents 111 generate a second alternating magnetic field 113 which is coupled back into the coil 112, which increases the load on the resonant circuit 115 influencing the amplitude and/or frequency of the resonant circuit 115. The closer the metal object is, the greater the induced eddy currents 111 and the more effect the second magnetic field 113 has on the magnitude and frequency of oscillation of the resonant circuit 115. The changes in amplitude and/or frequency of the resonant circuit 115 can be determined by detector 114 to give an output which is related to the proximity of the metal object.

A proximity threshold can be determined by determining a first output of the proximity sensor 106 with metal foil 108 wrapped around it and determining a second output without any metal nearby. The proximity threshold is, for example, the average of these first and second outputs. When it is determined that the output of the proximity sensor 106 is below the proximity threshold, it can be confirmed that a metallic object is in the vicinity of the electronic tag 100, which could be metal foil 108 which the offender has wrapped around electronic tag 100 in an attempt to block the electronic tag 100 from receiving the GPS signal 105 or transmitting the location information 109.

However, it is possible that the metallic object detected by the electronic tag 100 as being in the vicinity of the electronic tag 100 might not be metal foil 108 but could instead be some incidental metallic object that happens to be in the vicinity (such as furniture, a radiator, etc.) that has not been placed there deliberately in an attempt to block the electronic tag 100. To distinguish between deliberate attempts to block the electronic tag 100 with metal foil 108 and incidental metallic objects in the vicinity of the electronic tag 100, it may only be determined that metal foil 108 is in proximity of the electronic tag 100 when the output of the proximity sensor 106 is below the proximity threshold on a number of occasions when the GPS receiver 102 also fails to receive GPS signals 105 from GPS satellites 107, or when a reduction in the strength of the GPS signals 105 coincides with the output of the proximity sensor 106 falling below the proximity threshold.

To prevent false alarms, for example, due to noise causing the output of the proximity sensor 106 to fluctuate above/below the proximity threshold or due to transient metallic objects in the vicinity of the electronic tag 100, it may be necessary for the output of the proximity sensor 106 to be below the proximity threshold for a minimum number of occasions before it can be established that a deliberate attempt is being made to block the electronic tag 100 with metal foil 108.

The inductive proximity sensor 106 may be activated periodically (for example, on a regular schedule) to check for metal in proximity of the electronic tag 100. The inductive proximity sensor 106 may be activated when the strength of the GPS signals 105 is suddenly reduced, or when the GPS receiver 102 has failed to receive any GPS signals 105 for a selected period of time or on a number of occasions when the GPS receiver 102 has polled for GPS signals 105. The inductive proximity sensor 106 may be activated when the electronic tag 100 has been unable to receive a reply to a transmitted signal (such as a reply from the monitoring station 107 to confirm that the monitoring station 107 has received location information 109) within a selected period of time or on a number of occasions.

Memory 140 (such as flash memory or another computer-readable storage medium) stores a counter which is initially set to zero when the electronic tag 100 is manufactured or reset. Each time the inductive proximity sensor 106 is activated, the output of the inductive proximity sensor 106 is compared with the proximity threshold and it is confirmed whether the GPS receiver 102 is able to receive GPS signals 105. If the output from the proximity sensor 106 is below the proximity threshold and the GPS receiver 105 is unable to receive a GPS signal 105, the electronic tag 100 increments the counter. If the output from the proximity sensor 106 is above the proximity threshold and the GPS receiver 105 is able to receive a GPS signal 105, the electronic tag 100 decrements the counter. When the counter reaches an upper (blocked) threshold, this indicates that it is likely that metal foil 108 has been detected wrapped around the electronic tag 100 and a blocked state stored in memory 140 is set to blocked, and a record of the blocking start time is recorded in the memory 140.

The electronic tag 100 continues to activate the inductive proximity sensor 106 periodically, to check for changes in the blocked state. Again, each time the inductive proximity sensor 106 is activated, the output of the inductive proximity sensor 106 is compared with the proximity threshold and it is confirmed whether the GPS receiver 102 is able to receive GPS signals 105. If the output from the proximity sensor 106 is below the proximity threshold and the GPS receiver 105 is unable to receive a GPS signal 105, the electronic tag 100 increments the counter but caps the counter at the upper threshold. If the output from the proximity sensor 106 is above the proximity threshold and the GPS receiver 105 is able to receive a GPS signal 105, the electronic tag 100 decrements the counter. When the counter reaches a lower (unblocked) threshold, this indicates that it is likely that the metal foil 108 has now been removed from the electronic tag 100 and the blocked state stored in memory 140 is set to unblocked, and a record of the blocking end time is recorded in the memory 140.

In response to the blocked state changing to blocked, the electronic tag 100 will generate a message to be sent to the monitoring station 107 via antenna 104 the next time the blocked state changes to unblocked. The message may include the blocking start time and the blocking end time. The message will alert operators at the monitoring station 107 that the offender 103 was attempting to block the electronic tag 100 using metal foil 108 so that they can investigate and, if necessary, reprimand the person for tampering with their electronic tag 100.

Although the invention has been described in terms of specific embodiments, the skilled person will appreciate that various modifications could be made that would fall within the scope of the claimed invention.

The invention claimed is:

1. An electronic tag configured to be secured to a body of a person, the electronic tag comprising:
   an antenna configured to transmit or receive an electromagnetic signal; and
   an inductive proximity sensor configured to:
      determine a proximity of a metallic object to the electronic tag, based on electromagnetic coupling between the inductive proximity sensor and the metallic object; and
      determine, based on the proximity being below a proximity threshold, that a metallic object is attenuating the electromagnetic signal transmitted or received by the antenna;
   a counter configured to have a value that is changed towards a blocked threshold in response to a proximity determination being below the proximity threshold and changed towards an unblocked threshold in response to a proximity determination being above the proximity threshold; and
   a computer-readable storage medium configured to store a blocked state, wherein the blocked state is set to blocked in response to the value of the counter reaching the blocked threshold to indicate the electronic tag is blocked and the blocked state is set to unblocked in response to the value of the counter reaching the unblocked threshold to indicate the electronic tag is unblocked.

2. The electronic tag of claim 1, wherein it is determined that a metallic object is attenuating the electromagnetic signal transmitted or received by the antenna in response to both the proximity being below the proximity threshold and the electronic tag being unable to receive an electromagnetic signal.

3. The electronic tag of claim 1, wherein the inductive proximity sensor is activated either in response to the electronic tag being unable to receive an electromagnetic signal for a period of time, or in response to the electronic tag being unable to receive a reply to a transmitted electromagnetic signal within a period of time.

4. The electronic tag of claim 1, further configured to determine the location of the electronic tag based on an external location signal, and the inductive proximity sensor is activated in response to the electronic tag being unable to receive the external location signal for a period of time.

5. The electronic tag of claim 1, wherein the inductive proximity sensor periodically determines the proximity of the metallic object to the electronic tag.

6. The electronic tag of either of claim 1, wherein the electronic tag is configured to generate a message indicating a change in the blocked state.

7. The electronic tag of claim 6, wherein the message is transmitted to a monitoring station in response to the electronic tag being able to transmit and receive an electromagnetic signal.

8. The electronic tag of claim 7, wherein it is determined that the electronic tag is able to transmit and receive an electromagnetic signal based on determining that the proximity is above the proximity threshold.

9. The electronic tag of claim 1, wherein it is determined that a metallic object is attenuating the electromagnetic signal in response to the proximity being below a proximity threshold for one or more of: a period of time; a plurality of proximity measurements; and a plurality of failed attempts to obtain an external location signal.

10. The electronic tag of claim 1, wherein the metallic object is a metal foil.

11. The electronic tag of claim 1, wherein the metallic object is aluminum foil.

* * * * *